Patented Aug. 23, 1938

2,128,201

UNITED STATES PATENT OFFICE 2,128,201

PROCESS OF PREPARING COMPOUNDS OF AZOPROTEINS WITH HEAVY METALS

Max Bockmühl, Willy Ludwig, and Paul von Mutzenbecher, Frankfort-on-the-Main-Hochst, Germany, assignors to Winthrop Chemical Company, Inc., New York, N. Y., a corporation of New York No Drawing. Application August 18, 1936, Serial No. 96,698. In Germany December 7, 1934

3 Claims. (Cl. 260—113)

The present invention relates to a process of preparing compounds of azoproteins with heavy metals.

Azoproteins have already been prepared; compounds of azoproteins with heavy metals have, however, hitherto been unknown.

According to this invention these new compounds can be obtained by diazotizing a heavy metal compound of an aromatic amine and coupling the diazotized product with albumin or by subsequently introducing the heavy metal into an azoprotein. Heavy metals are those bearing in the periodic system of the elements the ordinal numbers 24 to 31, 42 to 50, 73 to 84 and 90 to 92; silver, gold, bismuth, mercury, copper and iron have proved to be particularly useful.

As albumin component there may be used serum, the serum fractions, casein, etc.

The resultant heavy metal compounds of the azoproteins possess valuable chemotherapeutic properties.

The following examples illustrate the invention:

(1) Ortho-auro-mercapto-para-aminobenzoic acid coupled with serum.

1.69 grams of ortho-mercapto-para-aminobenzoic acid are dissolved in a mixture of 20 cc. of water and 12.5 cc. of 4N-hydrochloric acid and the solution is diazotized, while cooling with ice, by means of N/10 solution of sodium nitrite until the coloration of potassium iodide starch paper remains. 250 cc. of horse serum are mixed with 75 cc. of a solution of sodium carbonate of 10 per cent strength and the diazotate solution is added, the reaction being alkaline to turmeric but not yet alkaline to phenolphthalein. After 1½ hours the whole is rendered feebly acid to Congo paper by addition of hydrochloric acid; the flakes produced are centrifuged, mixed with water, while stirring, and dissolved with caustic soda solution. The solution (about 200 cc.) is poured into 1 liter of alcohol of 95 per cent strength; a few drops of hydrochloric acid are added until flakes are produced; the precipitate is filtered, ground with water and dissolved by addition of a caustic alkali solution.

The solution is mixed with 4.8 grams of potassium-auric bromide (dissolved in a small quantity of water), again rendered slightly alkaline and allowed to stand over night. The following day the solution is rendered feebly acid to Congo paper by means of hydrochloric acid, precipitated by addition of a saturated solution of sodium chloride and then centrifuged to a clear solution; the precipitate is stirred with water, dissolved in an alkaline way and dialyzed in a "Cellophane" tube with the aid of distilled water until in the outer water no more chlorine ions can be detected.

(2) Ortho-argento-mercapto-para-aminobenzoic acid coupled with serum.

1.69 grams of ortho-mercapto-para-aminobenzoic acid are dissolved in a mixture of 20 cc. of water and 12.5 cc. of 4N-hydrochloric acid and the solution is diazotized, while cooling with ice, by means of N/10 solution of sodium nitrite until the coloration of potassium iodide starch paper remains. 250 cc. of horse serum are mixed with 75 cc. of a solution of sodium carbonate of 10 per cent strength and the diazotate solution is added, the reaction being alkaline to turmeric but not yet alkaline to phenolphthalein. After 1½ hours the whole is rendered feebly acid to Congo paper by addition of hydrochloric acid; the flakes produced are centrifuged, mixed with water, while stirring, and dissolved with caustic soda solution. The solution (about 200 cc.) is poured into 1 liter of alcohol of 95 per cent strength; a few drops of hydrochloric acid are added until flakes are produced; the precipitate is filtered, ground with water and dissolved by addition of a caustic alkali solution.

To the alkaline solution 20 cc. of a solution of silver nitrate are added drop by drop, while strongly stirring; stirring is continued for several hours; the solution is then rendered feebly acid to Congo paper by means of nitric acid and quantitatively precipitated in the form of flakes by addition of a saturated solution of ammonium sulfate. The flakes produced are centrifuged, dissolved in water, the solution is rendered alkaline to turmeric by addition of caustic soda solution and dialyzed with distilled water as described in Example 1.

(3) Cadmium-1-amino-3, 4-mercapto-benzimidazole coupled with casein.

0.51 gram of the hydrochloride of cadmium-1-amino-3, 4-mercaptobenzimidazole is dissolved in a mixture of 100 cc. of water and 4 cc. of 4N-hydrochloric acid and the solution is diazotized, while cooling with ice, with a 2N-solution of sodium nitrite. 3 grams of casein purified according to the method described by Hammarsten (Hammarsten "Lehrbuch der physiologischen Chemie", 11th edition, 1926, page 514) are dissolved in 125 cc. of a 2 per cent solution of sodium carbonate; the diazotate solution is added thereto, while stirring, and the mixture is allowed to stand for 1½ hours. Hydrochloric acid is then added and the precipitate is filtered. It is ground with water, dissolved with caustic soda solution and poured into 5 times its volume of alcohol. The precipitate produced in the alcohol is filtered, washed with alcohol and dried in a vacuum.

(4) Silver-serumproteinazobenzene.

9.3 grams of aniline are diazotized in known manner in a sulfuric acid solution and coupled at a soda-alkaline reaction with 2 liters of horse serum. The resultant azoprotein is precipitated by acidifying to a pH-value of 4, dissolved at a reaction alkaline to turmeric and in order to further purify it it is precipitated with 5 times its volume of alcohol. The precipitate is redissolved in as small a quantity of water as possible and dialyzed until it is free from salt.

The light red stable sol is mixed with 1 liter of N/10 silver nitrate solution, the reaction being kept freely alkaline to turmeric with sodium carbonate solution. By another thorough dialysis the electrolytes are eliminated. From the dark brown-red sol there may be obtained by precipitating with alcohol the solid substance having a content of silver of 8.5 per cent.

In the same manner, for instance, the corresponding copper compound may be obtained.

(5) Copper compound of 4-serum-azo-2-mercapto-benzene-1-carboxylic acid.

The process is at the beginning as described in the first paragraph of Example 1. To the dialyzed solution 100 cc. of N/10 copper sulfate solution are added, the reaction being kept slightly alkaline. The solution is then dialyzed as described in the second paragraph of Example 1. In the same manner the compound is precipitated in a solid form.

(6) Zinc compound with serum protein-azobenzenesulfonic acid.

7 grams of sulfanilic acid are diazotized in the usual manner in a hydrochloric acid solution and coupled at a turmeric-alkaline reaction with 500 cc. of horse serum, twice reprecipitated with acetic acid and purified by dialysis. 100 cc. of the dialyzed solution (having a contents of dry substance of 3.8 per cent) are caused to react with a solution of 0.74 gram of zinc sulfate in water with addition of caustic soda solution until the reaction is alkaline to turmeric. The solution is then dialyzed until the sulfate reaction in the outer water disappears. The final solution contains 2.1 per cent of dry substance and 0.063 per cent of zinc.

(7) Iron compound of protein-azobenzene sulfonic acid.

To 100 cc. of the stock solution of serum protein-azobenzene sulfonic acid prepared in the manner above described 0.4 gram of iron vitriol is added in an aqueous solution, the reaction being kept alkaline to turmeric. After dialysis the solution contains 3.1 per cent of dry substance and 0.04 per cent of iron.

(8) Cobalt compound of protein-azobenzenesulfonic acid.

To 100 cc. of the stock solution 0.64 gram of cobaltous chloride is added at a reaction alkaline to turmeric. The solution is dialysed as above described and then contains 2.7 per cent of dry substance and 0.21 per cent of cobalt.

(9) Lead compound of protein-azobenzenesulfonic acid.

To 100 cc. of a stock solution 0.56 gram of lead acetate is added in an aqueous solution at a reaction alkaline to turmeric. After dialysis the solution contains 3.2 per cent of dry substance and 0.13 per cent of lead.

(10) Bismuth compound of serum proteinazotartranilic acid.

3 grams of tartranilic acid according to Landsteiner ("Journal Exp. Med." volume 50, 1929, page 408) are dissolved in a mixture of 100 cc. of water and 35 cc. of a solution of hydrochloric acid of 10 per cent strength; the solution is diazotized with 110 cc. of a N/10 sodium nitrite solution and made up with ice water to 500 cc. 250 cc. of horse serum are mixed with 50 cc. of a sodium carbonate solution of 10 per cent strength and then, while cooling with ice, at first with ⅔ of the dilute diazotate solution. After 1½ hours the remaining ⅓ is added and the whole is allowed to stand for 1 hour. During all the time the reaction is kept feebly alkaline to phenolphthalein with a solution of sodium carbonate. An acid is added and the precipitate thus produced is centrifuged, dissolved in dilute caustic soda solution and dialyzed in the "Cellophane" tube, until the chlorine ions disappear in the outer water.

70 cc. of this 8 per cent solution are mixed with 15 cc. of a 10 per cent solution of sodium carbonate and a nitric acid solution of 1.6 grams of bismuth nitrate is added drop by drop, while stirring, the reaction being kept feebly alkaline by addition of caustic soda solution. After the dialysis the solution contains 1.9 per cent of dry substance and 0.1 per cent of bismuth.

(11) Mercury-di-benzeneazo-serum protein.

1 gram of mercurydianiline is diazotized in a hydrochloric acid solution with 52 cc. of a N/10 sodium nitrite solution and the diazotized product is coupled in a soda-alkaline solution with 125 cc. of horse serum. The product is reprecipitated with acid and purified by dialysis. The dialyzed solution contains 3.8 per cent of dry substance and 0.1 per cent of mercury.

We claim:

1. Process of preparing compounds from azoproteins and heavy metals which comprises diazotizing an amine of the benzene series, coupling the diazotate with albumin and causing the product thus obtained to react with a heavy metal compound.

2. Process of preparing compounds from azoproteins and heavy metals which comprises diazotizing an amine of the benzene series, coupling the diazotate with serum and causing the product thus obtained to react with a heavy metal compound.

3. Process of preparing compounds from azoproteins and heavy metals which comprises diazotizing ortho - mercapto - para - aminobenzoic acid, coupling the diazotate with horse serum and causing the product thus obtained to react with silver nitrate.

MAX BOCKMÜHL.
WILLY LUDWIG.
PAUL von MUTZENBECHER.